US00RE49588E

(19) United States
(12) Reissued Patent
Frost et al.

(10) Patent Number: US RE49,588 E
(45) Date of Reissued Patent: Jul. 25, 2023

(54) SCREED PLATE APPARATUS AND METHOD FOR HOMOGENEOUSLY APPLYING PAVING MATERIAL TO A ROAD SURFACE

(71) Applicant: Axenox, LLC., Powell, WY (US)

(72) Inventors: Stuart Anthony Frost, Cowley, WY (US); David Michael Frost, Jr., Cowley, WY (US)

(73) Assignee: AXENOX, LLC., Powell, WY (US)

(21) Appl. No.: 17/091,656

(22) Filed: Nov. 6, 2020

Related U.S. Patent Documents

Reissue of:
(64) Patent No.: 10,156,050
Issued: Dec. 18, 2018
Appl. No.: 16/120,239
Filed: Sep. 1, 2018

(51) Int. Cl.
*E01C 19/40* (2006.01)
*E01C 19/48* (2006.01)

(52) U.S. Cl.
CPC ..... *E01C 19/4853* (2013.01); *E01C 19/40* (2013.01); *E01C 19/48* (2013.01); *E01C 2301/10* (2013.01)

(58) Field of Classification Search
CPC ..... E01C 2301/10
USPC ..... 404/118; 68/223, 226, 228
See application file for complete search history.

(56) References Cited

U.S. PATENT DOCUMENTS 215,630 A * 5/1879 Kehoe ..... D06F 3/02 68/223
634,877 A * 10/1899 Carroll ..... D06F 3/02 68/226
1,987,232 A * 1/1935 Gilbert ..... D06F 3/02 68/228
2,000,943 A * 5/1935 Gilbert ..... D06F 3/02 68/228
2,306,124 A * 12/1942 Jackson ..... E01C 19/40 404/114
2,306,125 A 12/1942 Jackson ..... E01C 19/40 404/114

(Continued)

FOREIGN PATENT DOCUMENTS

CN 102037184 B 7/2013
EP 0663974 B1 9/1998
WO 9504859 A1 2/1995

*Primary Examiner* — Russell D Stormer
(74) *Attorney, Agent, or Firm* — ArentFox Schiff LLP

(57) ABSTRACT

The screed plate apparatus and method has a road paver/finisher, screed plate, and material matting apparatus having a power source and structural/conductor plate. Paving material is loaded into the material matting apparatus and applied homogeneously as a paving mat to a road surface in a road paver/finisher travel direction. The structural/conductor plate is attached to the road paver/finisher and to the screed plate to provide indirect heat to the screed plate. The screed plate bottom side has differing forms of textured surface impacting the paving material, by differing corrugations of differing patterns, into a more homogeneous consistency. The corrugated pattern may be oriented parallel or perpendicular to the paver travel direction, and/or progressively flattening or set in a crisscross rhombic pattern. A vibrating and oscillating mechanism operates horizontally and vertically upon the screed plate providing a homogeneously sorting on the paving material.

28 Claims, 8 Drawing Sheets

(56) References Cited

U.S. PATENT DOCUMENTS 2,312,220 A * 2/1943 Snyder ..... D06F 3/02 68/223
3,516,340 A * 6/1970 Perkins ..... E01C 19/43 404/75
3,555,983 A * 1/1971 Swisher, Jr. ..... E01C 19/407 404/114
3,595,143 A * 7/1971 Polselli ..... E01C 19/43 404/93
4,070,128 A * 1/1978 Garrison ..... E01C 19/43 15/144.4
4,375,709 A * 3/1983 Lewis ..... E04F 21/24 15/235.4
4,379,653 A * 4/1983 Brown ..... E01C 19/4853 404/104
4,865,487 A * 9/1989 Lutz ..... E01C 19/42 404/118
5,366,320 A * 11/1994 Hanlon ..... E01C 19/48 404/118
5,397,199 A * 3/1995 Frampton ..... E01C 19/40 404/118
5,417,516 A 5/1995 Birtchet
6,318,928 B1 * 11/2001 Swearingen ..... E01C 19/42 404/72
6,884,000 B2 * 4/2005 Sovik ..... E01C 19/407 404/118
6,981,820 B2 * 1/2006 Nelson ..... E01C 19/407 404/118
8,113,738 B2 2/2012 Mahler et al.
8,157,474 B2 * 4/2012 Mahler ..... E01C 19/48 404/95
8,517,630 B2 * 8/2013 Graham ..... E01C 19/48 404/118
9,103,078 B2 * 8/2015 Lutz ..... E01C 19/42
9,181,662 B2 11/2015 Kopacz et al.
9,382,675 B2 7/2016 Frelich et al.
9,657,447 B2 * 5/2017 Mattson ..... B05D 1/26
9,777,445 B1 10/2017 Engel et al.
10,017,905 B2 * 7/2018 Young, Jr. ..... E01C 19/4873
2002/0061227 A1 * 5/2002 Rahn ..... E01C 19/187 404/118
2014/0377003 A1 12/2014 Kopacz et al.
2015/0010355 A1 * 1/2015 Kopacz ..... E01C 19/48 404/118
2018/0266060 A1 * 9/2018 Schaffer ..... E04F 21/241

* cited by examiner

SCREED PLATE APPARATUS AND METHOD FOR HOMOGENEOUSLY APPLYING PAVING MATERIAL TO A ROAD SURFACE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

This patent disclosure relates to road paving machines and, more particularly, to screed plates for a road paving machine.

BACKGROUND OF THE INVENTION

The basic concept of the asphalt or concrete road paver system has remained relatively unchanged for many years. Screed plate assemblies and method for paving are found and utilized in various construction paving industrial settings, such as payment of highways, airports, streets and other sites requiring paving of constructional site beds and pads, requiring a paving mat. Paving materials, such as concrete or hot mix asphalt (HMA), is loaded in the front of the road paving tractor, typically in a hopper, and conveyed to the rear by a set of flight feeders (conveyor belts), where it is spread out to a desired width by a set of augers in the road paver, and then leveled and compacted by a screed plate. A critical feature of a road paver is the self-leveling, or free floating, screed plate which will determine the profile of the material being paved or placed on the road bed, the mat and its correct smoothness and thickness. The screed plate is the flat bottom portion of the screed assembly that flattens and compresses the material into the mat. The free floating screed plate slides across the material.

There has been a recognized in the road paving industry need for providing screed plates of differing textures to a road paving machine.

The conventional screed plate is constructed of a one piece metal alloy screed plate with a flat surface interacting with the paving materials. In the conventional technology used today, the paving machine provides an electrically heated screed assembly with heating elements attached to or adjacent to a screed plate. This conventional screed plate assembly provides for one screed plate underlying the paving machine. The road paver/finisher using the conventional screed plate has only one force vector applied on the material to the mat applied to the road surface. Only one force vector is applied on the material as it is paved on the road surface The references described in the related art do not disclose features of the present invention and would not be as suitable for the required purpose of the present invention hereinafter described. Screed plate apparatuss are found in the related art, exemplified by U.S. Pat. No. 9,382,675 to Frelich et al. ("Frelich") and U.S. Pat. No. 2,306,125 to Jackson ("Jackson"). Frelich discloses a paving machine having electrically powered vibrators to drive the screed assemblies, including one or screed plates configured to smooth the paving materials and a mechanism enabling further compaction of the paving material. There is no disclosure of a screed corrugation. Vertical vibration of a screed plate to achieve paving compaction is common in the industry, but there is no disclosure of horizontal or oscillating vibration in Frelich.

Jackson discloses a concrete paving machine having a screed provided with a means for generating, vibration, vibratory plates disposed on the front of the screed and a vertically fluted corrugated face portion having rearwardly curved lower edges. However, the bottom face of the screed plate is planar. The corrugated piece in Jackson is a tamper bar that operates separately from and in front of the screed plate. The apparatus in Jackson does not disclose or suggest corrugations or other texture on the bottom of the screed plate as set forth in the present invention. The corrugations of Jackson are limited to the vertical face portion of the screed, and are uniform throughout. There is no suggestion in these references for providing such corrugations on the bottom of the screed plate.

None of the references in the prior art contain every feature of the present invention, and none of these references in combination disclose, suggest or teach every feature of the present invention. The present invention is neither disclosed nor suggested by the prior art.

The foregoing and other objectives, advantages, aspects, and features of the present invention will be more fully understood and appreciated by those skilled in the art upon consideration of the detailed description of a preferred embodiment, presented below in conjunction with the accompanying drawings.

SUMMARY OF THE INVENTION

The present invention is a screed plate apparatus and method for homogeneously applying paving material to a road surface includes a road paver/finisher, a screed plate having a screed plate front side and an opposing screed plate back side, a screed plate top side and an opposing screed plate bottom side, a screed plate first side and an opposing screed plate second side, and a coupling element incorporated into the screed plate front side, as well as, at least two screed plate attaching means, located on the screed top side.

The road paver/finisher includes a material matting apparatus having a plate bottom and paving material, a power source, a heating element, and a structural/conductor plate. The material matting apparatus is an integrated component in the road paver/finisher, and contains paving material loaded into the material matting apparatus to pave surfaces and distributes that material from the road paver/finisher during paving operation, as the road paver/finisher paves or traverses in a paver travel direction.

The structural/conductor plate comprises a conductor top side and an opposing conductor bottom side, a conductor front side and an opposing conductor back side, a plurality of conductor plate fastening means, and at least two screed plate retaining means located on the opposing conductor bottom side. The plurality of conductor plate fastening means securely attach the structural/conductor plate directly to the plate bottom of the road paver/finisher. The coupling element enables a pressure connective coupling of the coupling element to the structural/conductor plate.

The power source generates heat to the heating element to preheat the screed plate so that the paving material does not stick to the screed plate. The heating element is located between the plate bottom and the conductor top side and, immediately against the conductor top side providing direct heat to the structural/conductor plate.

The at least two screed plate retaining means receive the appropriately matching and paired at least two screed plate attaching means, from the screed plate top side, and the conductor front side receives the appropriately matching and paired coupling element of the screed plate, whereby the structural/conductor plate heat-conductively attaches at the opposing conductor bottom side to the screed plate at the screed plate top side provides indirect heat to the screed plate.

The material matting apparatus applies paving material homogeneously as a paving mat to a road surface in a paver travel direction traversed by the road paver/finisher. The opposing screed plate bottom side further comprises a textured surface impacting the paving material as the screed plate compacts the paving material to the road surface. Differing forms of textured surface are provided in alternative embodiments, by the differing patterns or corrugations, allows the screed plate apparatus to manipulate the particular paving material applied to the road surface as the paving mat in a more homogeneous manner. In alternative embodiments to the screed plate apparatus the textured surface comprises a corrugated pattern orienting parallel to the paver travel direction, or orienting perpendicularly to the paver travel direction, and/or progressively flattening in a dampening corrugated pattern from the screed plate first side toward the opposing screed plate second side, or in a crisscross rhombic pattern, orienting acutely to the paver travel direction. In any of the embodiments, the plurality of corrugations comprise various forms, those being at least one of a repetitive wave form, a repetitive v-shaped pattern, a repetitive block shaped pattern, or a variably shaped wave pattern.

In another embodiment the material matting apparatus comprises a vibrating and oscillating mechanism, causing the material matting apparatus to forcibly operate horizontally and vertically upon the screed plate providing a homogeneously sorting on the paving material.

In another embodiment of the present invention, the power source causes the heating element to directly heat the screed plate.

In advantage of the present invention is that differing types of paving material may be employed to allow for differing products to be used to create a paving mat on the road surface. Another advantage is that the screed plate may be made of different materials.

The variable wave design allows the material matting apparatus to compact the paving material into a paving mat. The screed plate apparatus allows, therefore, the paving material to be compartmentalized under the screed plate by the addition of variable force vectors employed on the paving material at varying angles, producing a more homogeneous paving mat. The screed plate apparatus is driven in one alterative by the vibrating or oscillating mechanism which provides the varying force vectors to the paving material.

The variable corrugated or wave screed plate can be used for the laying of pavement, using differing paving materials, including bituminous plant mix concrete, Portland cement concrete or other surface or subsurface materials. The flexibility [in sue] *therefore* will improve the texture and density of the paving material directly behind the screed plate and make further compaction of the paving material where needed easier to achieve. The present invention may be used in any paving application where paving material is being laid into the paving mat, from particulate materials, as well, for road surface, including for highways, airpost runways, roads and parking lot pavings. The advantage of the present invention is that these variable force vectors will organize and apply added force to the paving material, improving paving mat texture and density, as desired, allowing an increased over-all density to the paving mat, and increased density in road surface, combating ruts and irregularities, providing a more stable road surface.

The aforementioned features, objectives, aspects and advantages of the present invention, and further objectives and advantages of the invention, will become apparent from a consideration of the drawings and ensuing description.

BRIEF DESCRIPTION OF THE SEVERAL VIEWS OF THE DRAWINGS

The foregoing features and other aspects of the present invention are explained and other features and objects of the present invention will become apparent in the following detailed descriptions, taken in conjunction with the accompanying drawings. However, the drawings are provided for purposes of illustration only, and are not intended as a definition of the limits of the invention.

FIG. 2A illustrates a bottom perspective view of an embodiment of the present invention, depicting repetitive wave forms of the plurality of corrugations orienting parallel to the paver travel direction.

FIG. 2B illustrates a bottom perspective view of an embodiment of the present invention, depicting repetitive wave forms of the plurality of corrugations orienting perpendicular to the paver travel direction.

FIG. 3A illustrates a front side view of an embodiment of the present invention depicting repetitive wave forms as a corrugated pattern in a plurality of corrugations.

FIG. 4A illustrates an elevated front side view of an embodiment of the present invention depicting a dampened corrugated pattern from a plurality of corrugations.

FIG. 4B illustrates an elevated side view of an embodiment of the present invention depicting a dampened corrugated pattern from a plurality of corrugations.

DETAILED DESCRIPTION OF THE INVENTION

Figure 1:
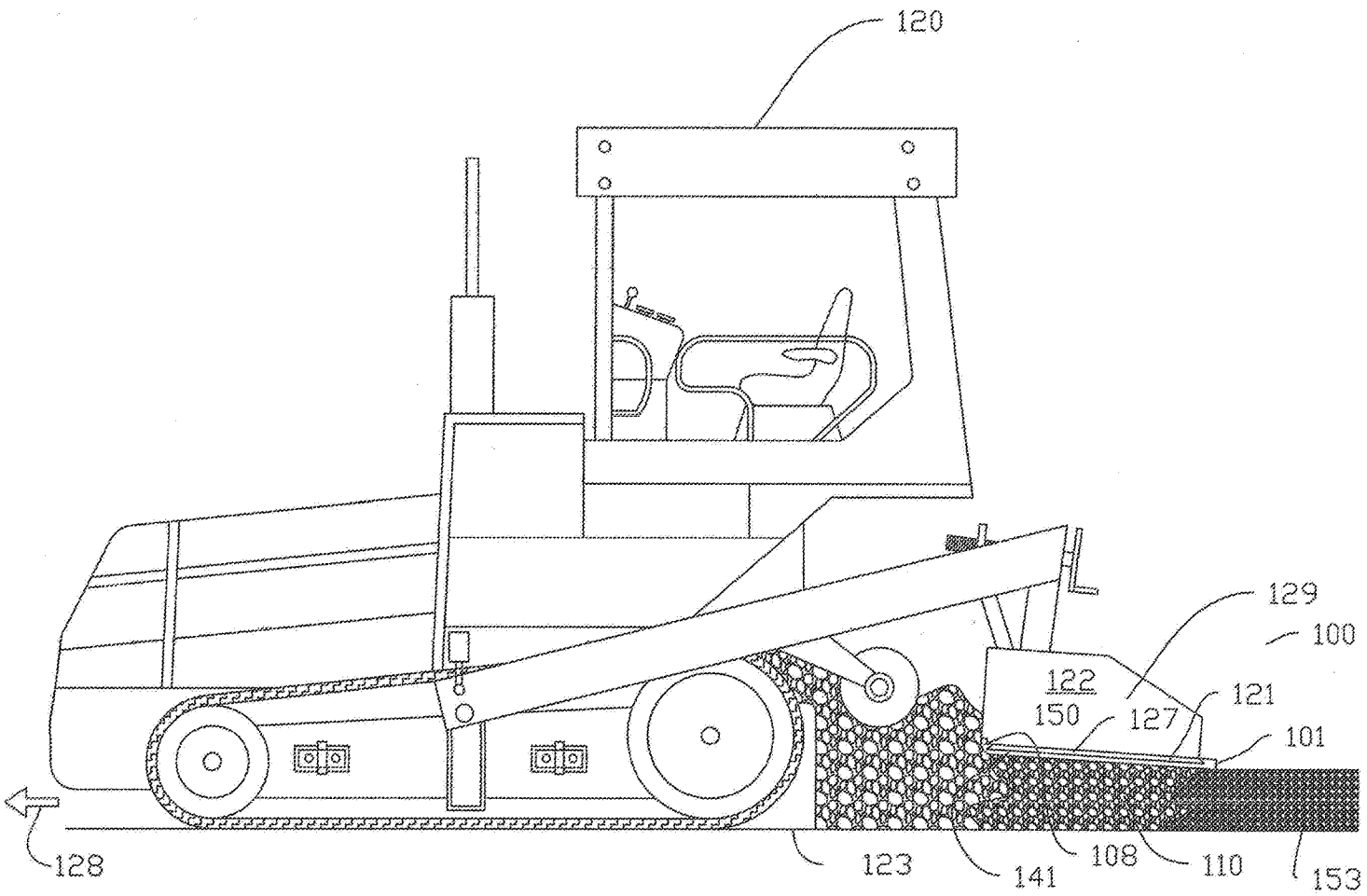
FIG. 1 illustrates an elevated side view of one embodiment of the present invention, as attached to a road paver/finisher.

The present invention will now be described more fully hereinafter with references to the accompanying drawings, in which the preferred embodiment of the invention is shown. This invention, however, may be embodied in different forms, and should not be construed as limited to the embodiments set forth herein. Rather, the illustrative embodiments are provided so that this disclosure will be thorough and complete, and will fully convey the scope of the invention to those skilled in the art. It should be noted, and will be appreciated, that numerous variations may be made within the scope of this invention without departing from the principle of this invention and without sacrificing its chief advantages. Like numbers refer to like elements throughout. A representative number of certain repeated elements are labeled in the drawings.

Turning now in detail to the drawings in accordance with the present invention, one embodiment of the present invention, the screed plate apparatus 100, is depicted in FIG. 1, includes an elevated side view of a road paver/finisher 120. The screed plate apparatus 100 further comprises, as more particularly depicted in FIGS. 2A-B and 4B, a screed plate 101 having a screed plate front side 102 and an opposing screed plate back side 103, a screed plate top side 104 and an opposing screed plate bottom side 105, a screed plate first side 106 and an opposing screed plate second side 107, and a coupling element 108 incorporated into the screed plate front side 102, as well as, at least two screed plate attaching means 109, as depicted in FIG. 4B, located on the screed top side 104. The road paver/finisher 120, in this embodiment of the present invention, as well as in alternative embodiments, may be any one of a number of types and brands of surface or road paver/finishers well known and used in the surface paving industry. The at least two screed plate attaching means 109, as depicted in FIG. 4B, located on the screed top side 104, are not visible in FIGS. 2A-4A, 5 and 7, but are to be assumed hereby to be found on those alternative embodiments.

Figure 6:
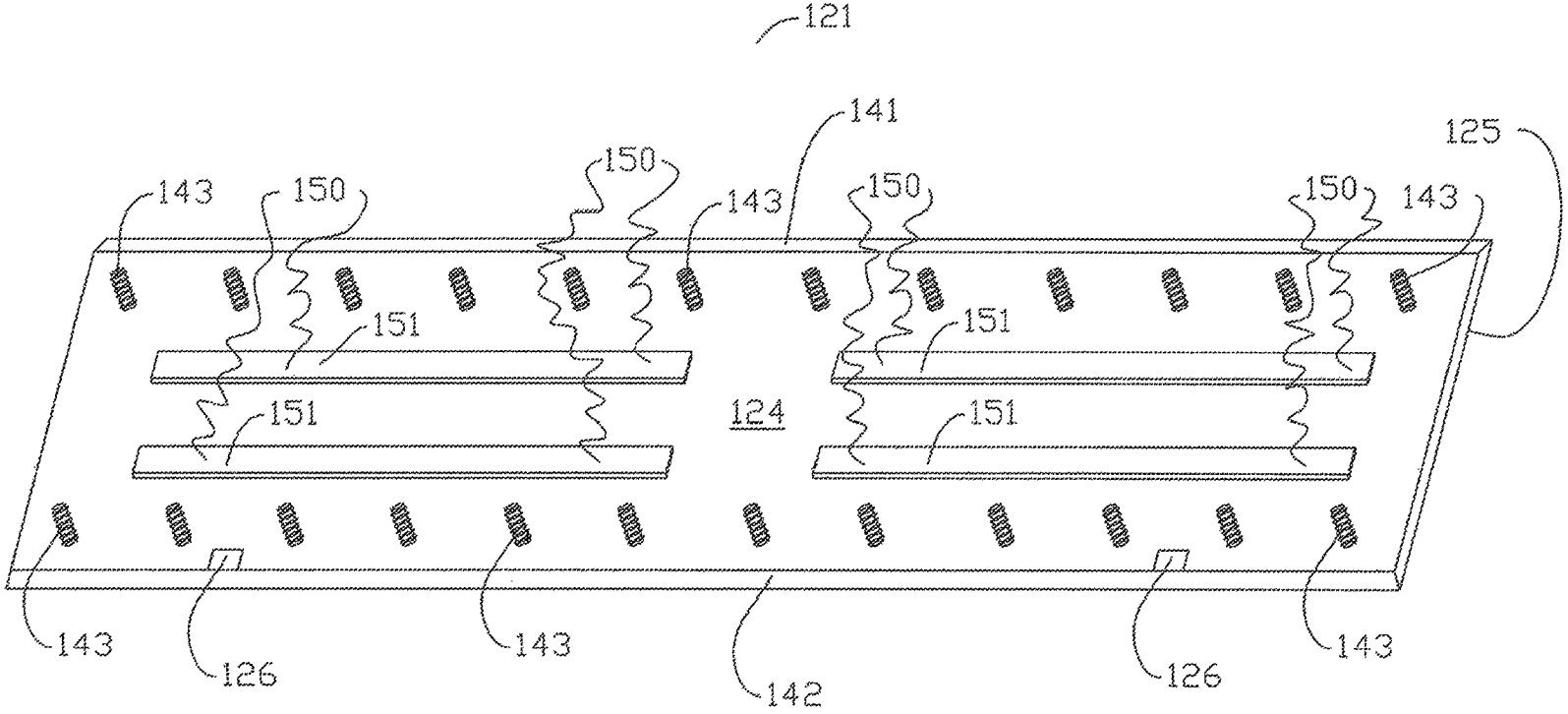
FIG. 6 illustrates a perspective view of one embodiment of the present invention, depicting a top conductor side of the structural/conductor plate of FIG. 3, having at least one electrical heating strip as a heating element. The heating element is depicted in FIGS. 1 and 3 should be understood herein as receiving electricity or other form of heat from the power source, by a jagged line from the power source.

The road paver/finisher 120, shown in FIGS. 1 and 6 comprises a material matting apparatus 122 having a plate bottom [125] *127* and paving material 110, a power source 150, a heating element 151, and a structural/conductor plate 121. The material matting apparatus 122 is an integrated component in the road paver/finisher 120 well known in the industry. The material matting apparatus 122 contains paving material 110 loaded into the material matting apparatus 122 to pave surfaces, such as roads or other surfaces, and distributes that material from the road paver/finisher 120 during paving operation, as the road paver/finisher 120 paves or traverses in a paver travel direction 128, as depicted in FIG. 1. The material matting apparatus 122 is an apparatus integrated into the road paver/finisher 120 and is to be understood to be an apparatus well known and commonly found in road paver/finishers. The paving material 110 may be any number of materials as determined by a road surface 123 required for a particular project.

The structural/conductor plate 121, shown in FIGS. 1 and 6, comprises a conductor top side 124 and an opposing conductor bottom side 125, a conductor front side 141 and an opposing conductor back side 142, a plurality of conductor plate fastening means 143, and at least two screed plate retaining means 126 located on the opposing conductor bottom side 125. The plurality of conductor plate fastening means 143 securely attach the structural/conductor plate 121 at the conductor top side 124 directly to the plate bottom 127 of the [road paver/finisher 120] *material matting apparatus 122*, as shown in FIG. 1. The plurality of conductor plate fastening means 143, depicted in FIG. 6, in this embodiment comprise a plurality of threaded nut and bolt fastenings, and may be other fastening means. The coupling element 108, depicted in FIGS. 1, 2A-B, 4B, 5 and 7, may be any number of elements having a curving or angular configuration integrated into the screed plate 101 enabling a pressure connective, secure attachment or coupling of the coupling element 108 to the conductor front side 141 of the structural/conductor plate 121.

The power source 150 provided by the road paver/finisher 120, depicted in FIG. 1, and attached to the heating element 151, generates and provides at least one of electric, gas or hydraulic heat to the heating element 151 causing the heating element 151 to heat, as depicted in FIG. 6, the drawing to which is more particularly explained above. Screed heaters or heating elements 151 are used to preheat the screed plate 101 so that the paving material 110 does not stick to the screed plate 101 and cause mat, or applied paving material 110, tearing during operation. The power source 150 attached to heat the heating element 151 in alternative embodiments of the present invention may comprise electrical, gas or hydraulic power, to produce electrical heat, gas heat or hydraulic heat in the heating element 151.

The heating element 151, as depicted in FIG. 1, is freely and securely located between the plate bottom 127 and the conductor top side 124 and, immediately against the conductor top side 124 providing direct heat to the structural/conductor plate 121.

The at least two screed plate retaining means 126, shown in FIG. 6, to the structural/conductor plate 121 securely and respectively receive the appropriately matching, and paired with, the at least two screed plate attaching means 109, shown in FIG. 4B, from the screed plate top side 104. The conductor front side 141, in FIG. 6, securely and freely receives the appropriately matching and paired coupling element 108 of the screed plate 101, show in FIGS. 4B and 6. By this manner, the structural/conductor plate 121 securely and heat-conductively contacts and attaches at the opposing conductor bottom side 105 to the screed plate 101 at the screed plate top side 104, whereby the structural/conductor plate 121 provides indirect heat to the screed plate 101 in the screed plate apparatus 100.

The material matting apparatus 122, depicted by FIG. 1 applies paving material 110 homogeneously as a paving mat 153 to a road surface 123 in a paver travel direction 128 as traversed by the road paver/finisher 120. The opposing screed plate bottom side 105 further comprises a textured surface 130, the textured surface 130 impacting the paving material 110 on the road surface 123, as the screed plate 100 compacts the paving material 110 to the road surface 123. The differing forms of textured surface 130, as discussed below in differing alternative embodiments, by the differing patterns or corrugations, allows the screed plate apparatus 100 to impact or manipulate the particular paving material 110 as it is applied on the road surface 123 to cause the paving material 110 to be applied to the road surface as the paving mat 153 in a more homogeneous manner.

Figure 2A:
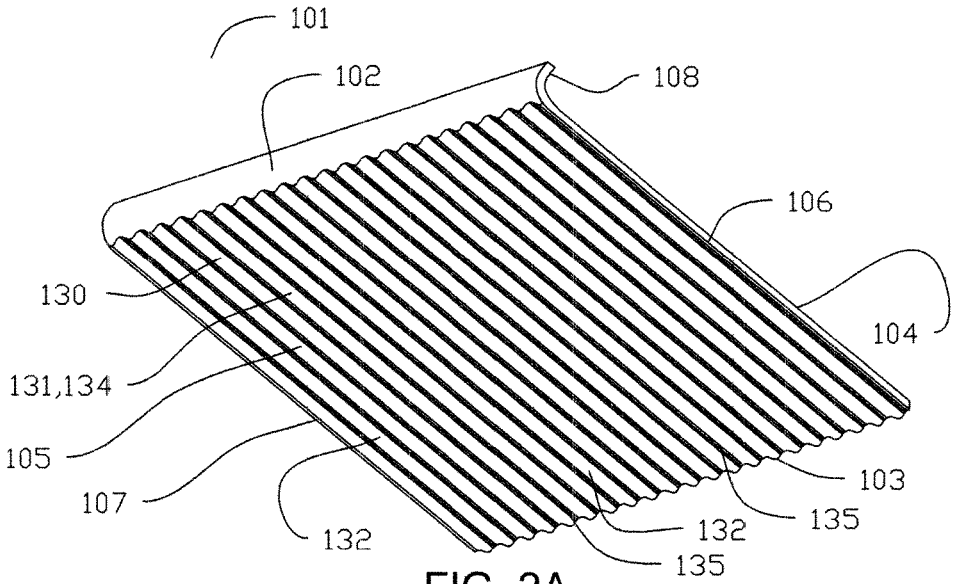
FIGS. 2A-B illustrate two bottom perspective views of embodiments of the present invention, depicting repetitive wave forms in a plurality of corrugations.
Figure 2B:
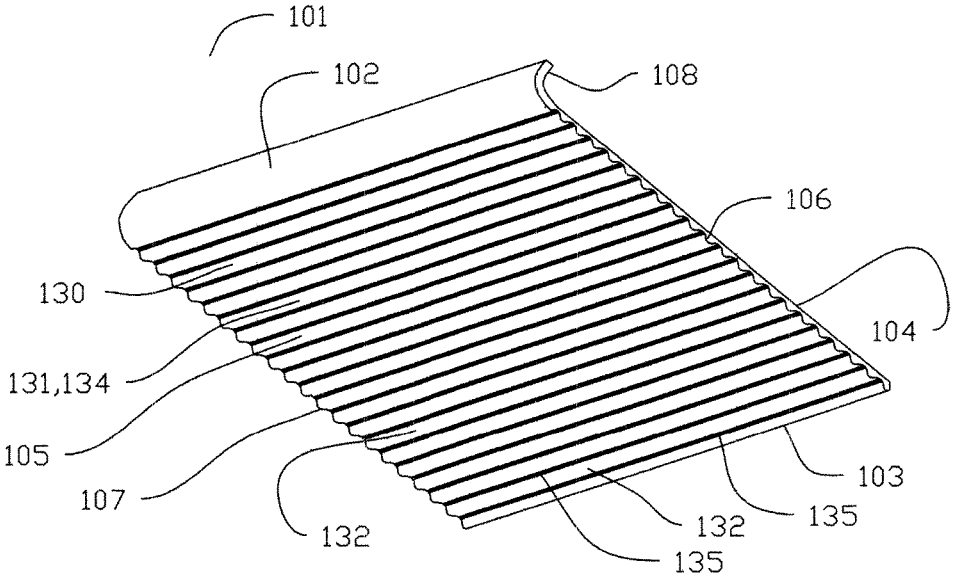
Figure 3A:
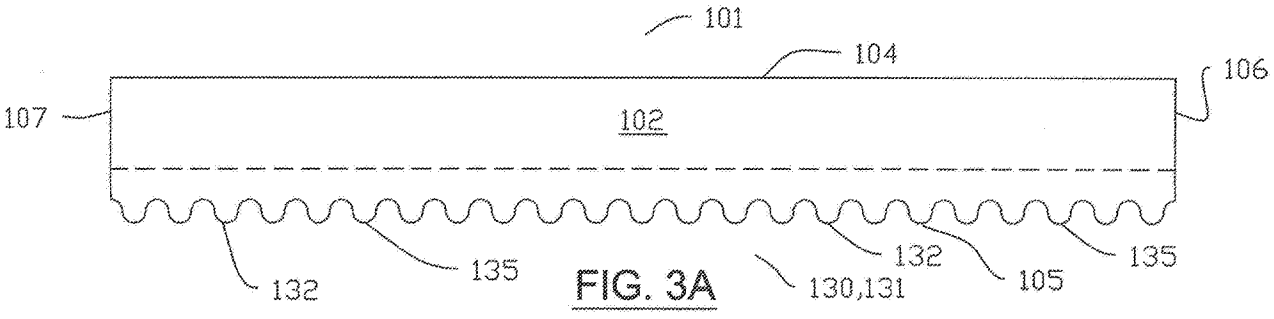
FIG. 3A C illustrate three elevated front side views of embodiments of the present invention.
Figure 3B:
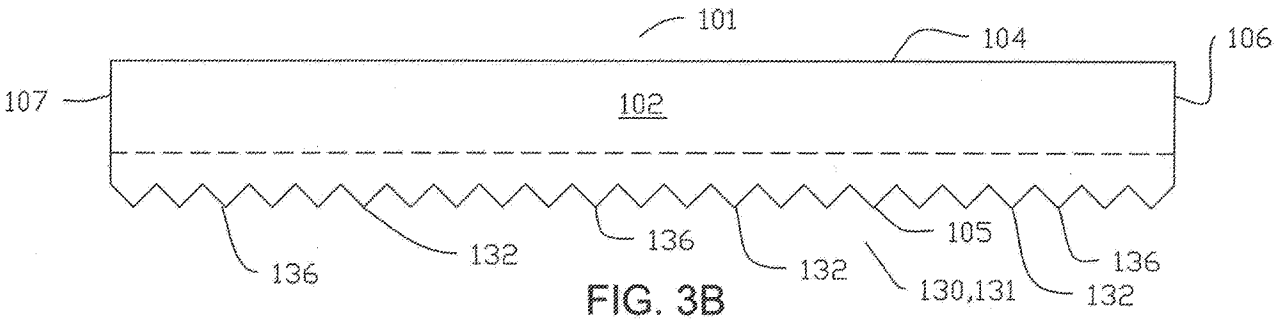
FIG. 3B illustrates a front side view of an embodiment of the present invention depicting a repetitive v-shaped pattern as a corrugated pattern in a plurality of corrugations.
Figure 3C:
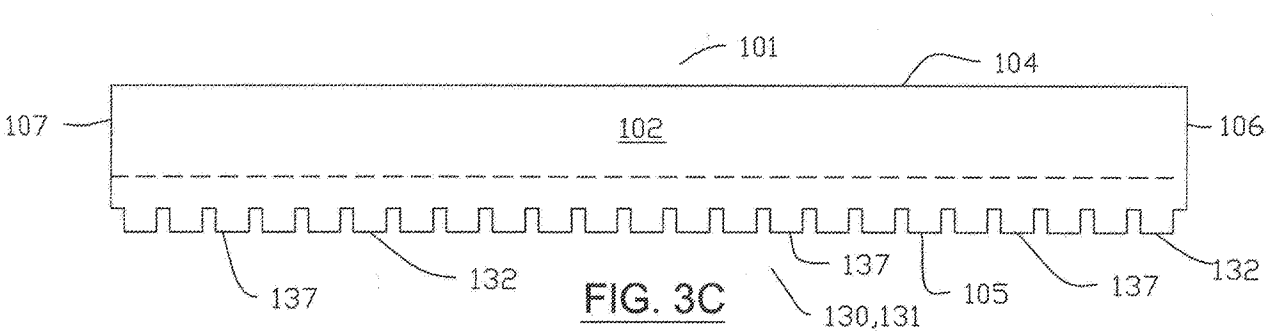
FIG. 3C illustrates a front side view of an embodiment of the present invention depicting a repetitive block pattern as a corrugated pattern in a plurality of corrugations.
Figure 4A:
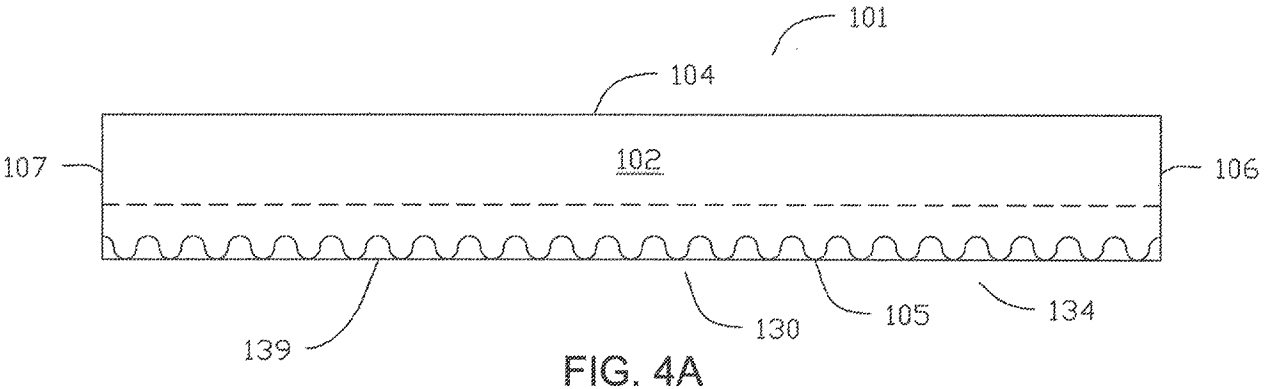
FIG. 4A-B illustrate two elevated views an embodiment of the present invention depicting repetitive wave forms producing a dampened corrugated pattern from a plurality of corrugations.
Figure 4B:
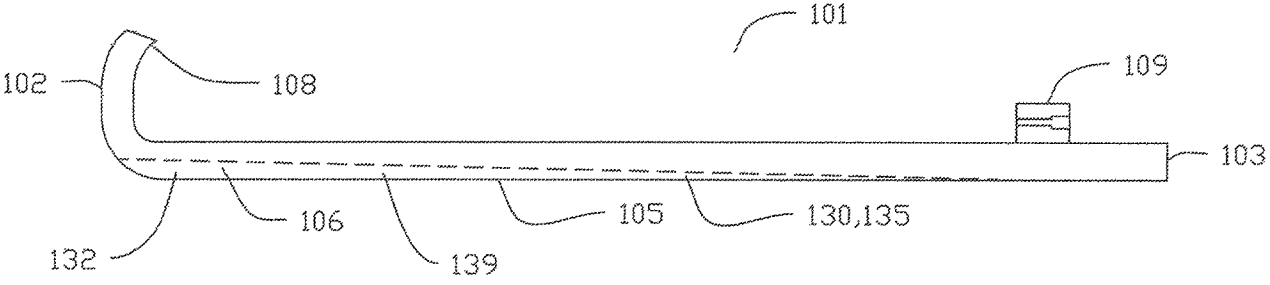
Figure 5:
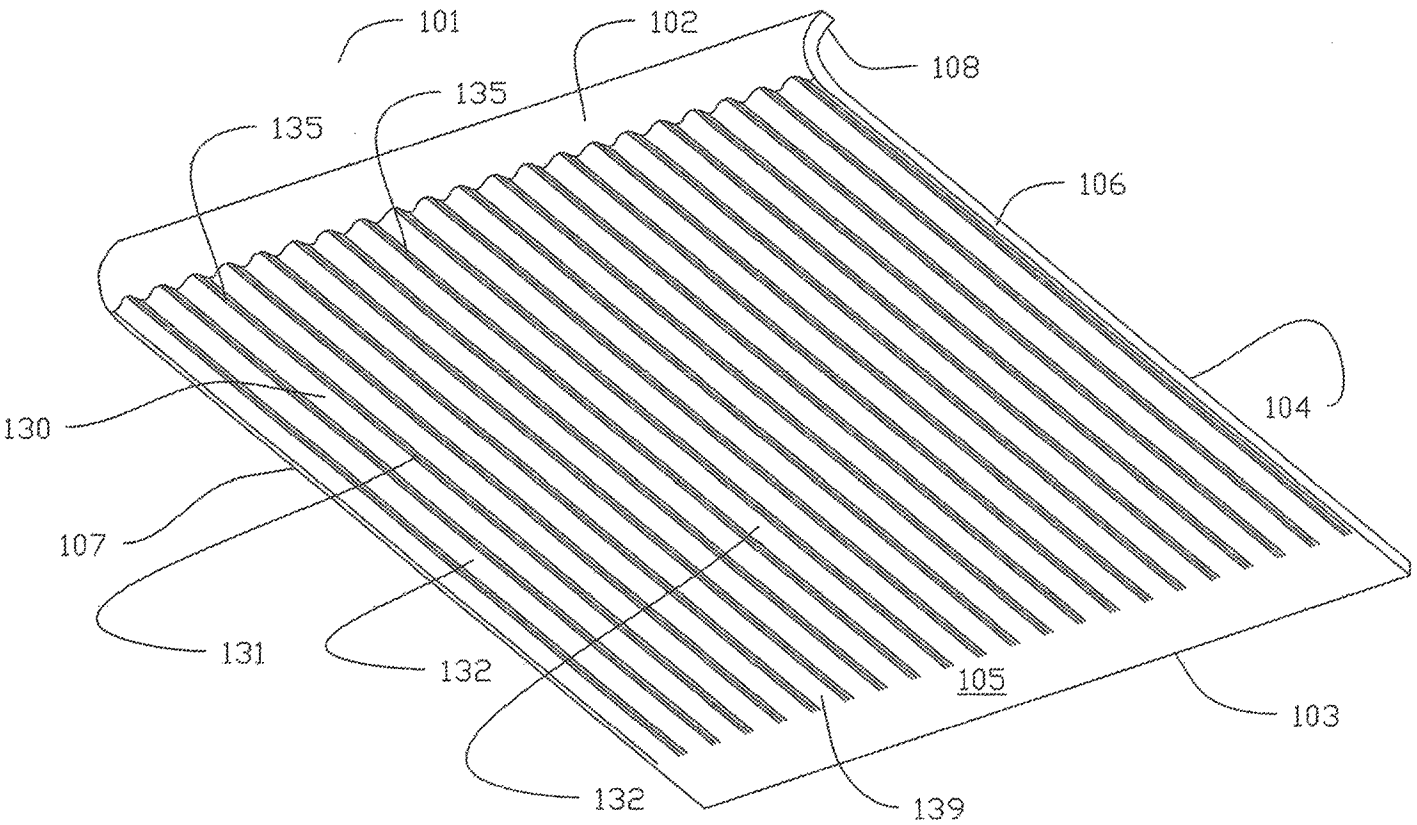
FIG. 5 illustrates a bottom perspective view of the embodiment of the present invention depicted in FIGS. 4A-B, depicting repetitive wave forms producing a dampened corrugated pattern from a plurality of corrugations.

In other embodiments of the present invention to the screed plate apparatus 100 the textured surface 130 comprises a corrugated pattern 131 comprising a plurality of corrugations 132, as shown in FIGS. 2A-B, 3A-C, 4A-B and 7. In one embodiment, shown in FIGS. 2 and 3A, the corrugated pattern 131 has the plurality of corrugations 132 orienting parallel to the paver travel direction 128 shown in FIG. 1. In another embodiment, FIG. 2B, the corrugated pattern 131 has the plurality of corrugations 132 orienting perpendicularly to the paver travel direction 128 shown in FIG. 1. In another embodiment, the plurality of corrugations 132 progressively flattening in a dampening corrugated pattern 139 from the screed plate first side 106 toward the opposing screed plate second side 107, as shown in FIGS. 4A-B, and 5. In any of the embodiments, the plurality of corrugations 132 comprise various forms, those being at least one of a repetitive wave form 135, a repetitive v-shaped pattern 136, a repetitive block shaped pattern 137, as shown in FIG. 3A-C, or a variably shaped wave pattern with any of the referenced patterns or other patterns.

Figure 7:
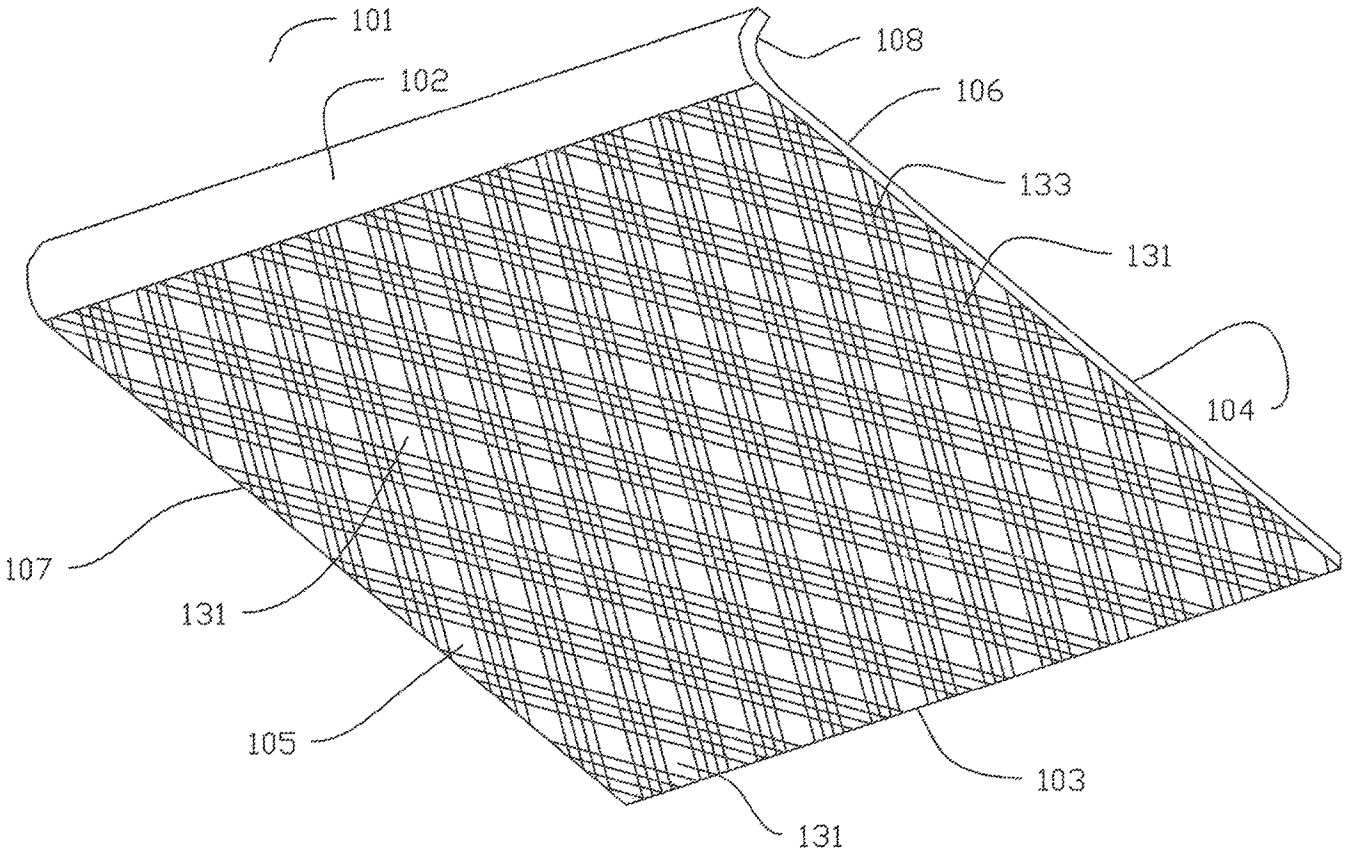
FIG. 7 illustrates a bottom perspective view of one embodiment of the present invention, depicting a crisscross, or mogul, pattern in a plurality of corrugations. In its two dimensional, planar view, the mogul pattern resembles repeating diamond shapes as quadrilaterals, 2-dimensional flat figures that have four closed, generally straight sides, each categorized as a rounded rhombus, because of four equal sides and opposite equal angles, two acute and two obtuse, with the rhombus orienting acutely or obtusely. In this FIG. 7, it is understood that, when viewed from this FIG. 7 perspective, the diagonal sets of lines represent shading to depict troughs, indentations or topographical lows in the corrugation surface, and the diamond shaped open spaces represent mounds, hummocks or topographical highs in the plurality of corrugations, which are acutely oriented in the direction of travel of the road paver/finisher depicted in FIG. 1.
Figure 8:
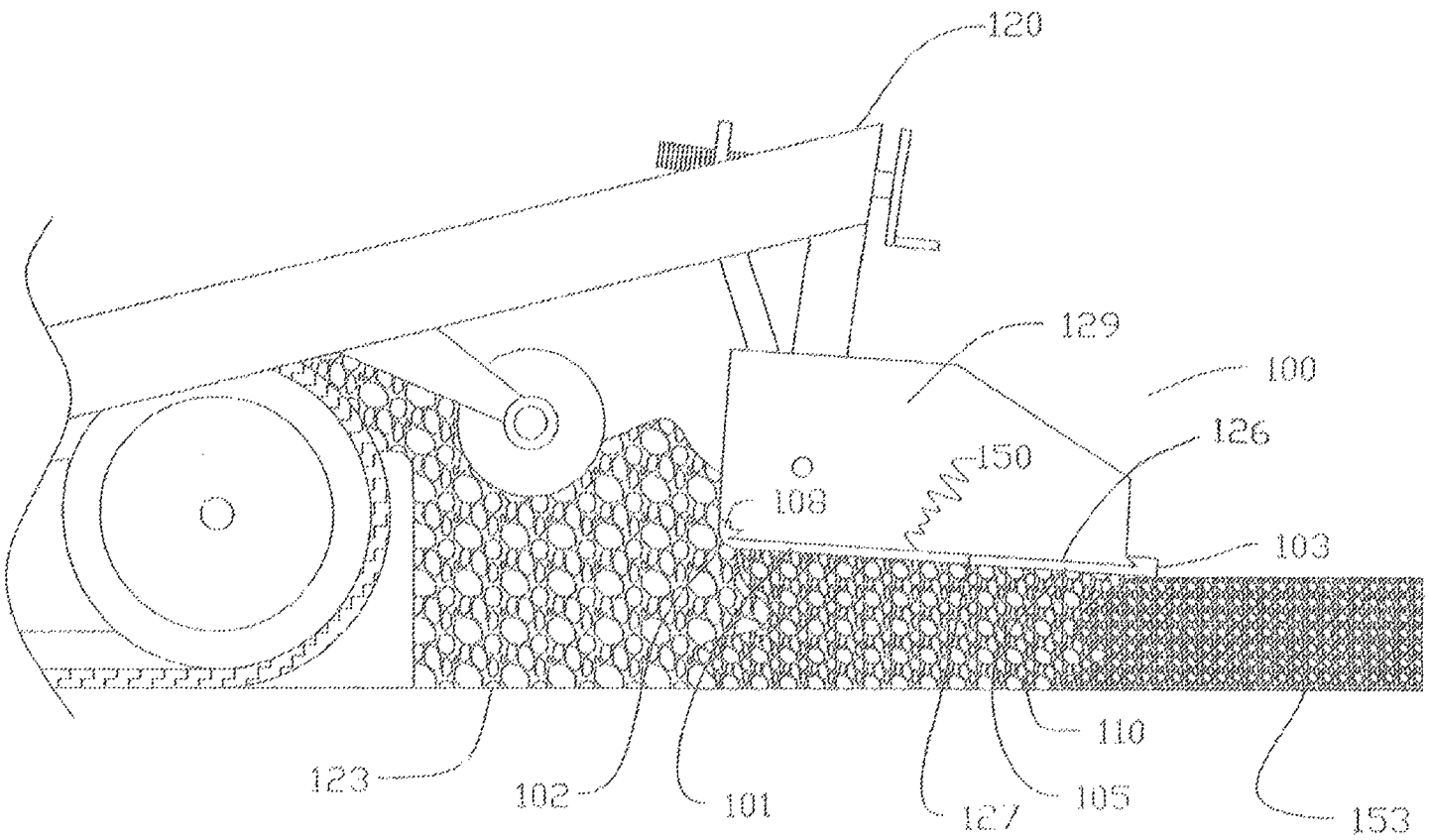
FIG. 8 illustrates a blown up partial, elevated side view of FIG. 1, of one embodiment of the present invention, depicting a screed plate apparatus, without a structural/conductor plate.

In another embodiment of the present invention, the corrugated pattern 131 comprises a crisscross rhombic pattern 133, depicted in FIG. 7, orienting acutely to the paver travel direction 128 shown in FIG. 1. As noted above in the discussion of FIG. 7, this embodiment depicts a crisscross, or mogul, rhombic pattern in a plurality of corrugations acutely oriented to the direction of travel 128 shown in FIG. 1. In this FIG. 7, it is understood that, when viewed from this perspective, the diagonal sets of lines represent shading to depict troughs, indentations or topographical lows of the crisscross pattern 133 in the plurality of corrugations 133, and the diamond shaped open spaces represent mounds, moguls, hummocks or topographical highs of the crisscross pattern 133 in the plurality of corrugations 131, which are acutely oriented in the direction of travel of the road paver/finisher depicted in FIG. 1.

In another embodiment of the screed plate apparatus 100, shown in FIG. 1, the material matting apparatus 122 further comprises a vibrating and oscillating mechanism 129 powered by the road paver/finisher 120. The vibrating and oscillating mechanism 129 contained within the road paver/finisher 120 causes the material matting apparatus 122 to forcibly operate horizontally and vertically upon the screed plate 101, providing a homogeneously sorting, horizontal and vertical driving function on the paving material 110. In this manner, a homogeneous paving material 110 is produced, and that paving material 110 is homogeneously applied to the road surface 123 as the road paver/finisher 120 traverses in the paver travel direction 128. The vibrating and oscillating mechanism 129 to the material matting apparatus 122 is an integrated component commonly found in the road paver/finisher 120 and well known in the industry; however, the vibrating and oscillating mechanism 129 in the present invention operates in a unique manner on the screed plate apparatus 100, and particularly on the screed plate 101 proving added force to the screed plate 101 to produce a more dense paving material 110.

In another embodiment of the present invention, the power source 150, depicted in [FIGS. 2A, 4B and] *FIG.* 8, generates and provides at least one of electric, gas or hydraulic heat to the heating element 151 causing the heating element 151 to heat the screed plate 101. The heating element 151 is freely and securely located between the plate bottom 127 and the screed plate top side 104 and, immediately against the screed plate top side 104 providing direct heat to the screed plate 101. The at least two screed plate retaining means 126 securely receiving the respective at least two screed plate attaching means 109, and the plate bottom 127 securely and freely receiving the coupling element 108, as they are depicted in FIG. 4B. The heating element 151 providing direct heat to the screed plate 101.

Another embodiment of the present invention is a method for homogeneously applying paving material 110 to a road surface 123, as shown in FIG. 1, the method providing for a screed plate 101 having a screed plate front side 102 and an opposing screed plate back side 103, a screed plate top side 104 and an opposing screed bottom side 105, a screed plate first side 106 and an opposing screed plate second side 107, the screed plate 101 having at least two screed plate attaching means 109 located on the screed plate top side 104. The method incorporated a coupling element 108 into the screed plate front side 102, as depicted in FIGS. 2A-B.

This method, alternative embodiment of the present invention, also provides for a road paver/finisher 120, shown in FIG. 1, comprising a material matting apparatus 122 having paving material 110, a plate bottom 127 and a structural/conductor plate 121. The structural/conductor plate 121, shown in FIG. 6, is comprised of a conductor top side 124 and an opposing conductor bottom side 125, a conductor front side and an opposing conductor backside, a plurality of conductor plate fastening means, and at least two screed plate retaining means located on the opposing conductor bottom side. This method provides the structural/conductor plate 121 securely attached directly to the plate bottom 127, in FIG. 1, by the plurality of conductor plate fastening means at the conductor top side 124, in FIG. 6, directly to the plate bottom 127 of the [road paver/finisher 120] *material matting apparatus 122*.

The method provides for applying paving material 110 which is homogeneous to a road surface 123 in a paver travel direction 128 as traversed by the road paver/finisher 120 using the material matting apparatus 122, as depicted in FIG. 1, and providing heat to the structural/conductor plate 121 by the road paver/finisher 120, by providing a power source to the road paver/finisher 120 attaching to a heating element 151 and generating and providing electricity by a power source 150 to the heating element 151 causing the heating element to heat. The method locates the heating element 151 freely and securely between the plate bottom 127 and the conductor top side 124 and immediately against the conductor top side 124, to provide direct heat to the structural/conductor plate 121, depicted in FIGS. 1 and 6.

The method also provides, in FIGS. 1, 4B and 6, for securely and receiving or joining the respective at least two screed plate attaching means 109 to or with the at least two screed plate retaining means 126, and freely and securely receiving the coupling element 108 against the conductor front side 141 while securely and heat-conductively contacting and attaching the opposing conductor bottom side 125 of the structural/conductor plate 121 to the screed plate 101 at the screed plate top side 104 for providing indirect heat to the screed plate 101 by and through the structural/conductor plate 121.

The method alternative embodiment to the present invention provides a textured surface 130 on the opposing screed bottom side 105, as depicted in FIG. 1. The textured surface 130 impacts the paving material 110 applied by the material matting apparatus on the road surface 123 as the screed plate 101 compacts and applies the paving material 110 homogeneously to the road surface 123 as the road paver/finisher 120 traverses the road surface 123 in the paver travel direction 128.

Shown in FIGS. 2A-5 and 7, the textured surface 130 comprises a corrugated pattern 131 comprising a plurality of corrugations 132. The differing forms of the textured surface 130, by differing patterns or corrugations, allows the screed plate apparatus 100 to impact or manipulate the particular paving material 110 as it is applied on the road surface 123 to cause the paving material 110 to be applied to the road surface in a more homogeneous manner or other desired manner, creating a more homogeneous paving material 110. One alternative method provides for orienting the plurality of corrugations 132 parallel to the paver travel direction 128. Another provides the corrugated pattern 131 comprising the plurality of corrugations 132 oriented perpendicularly to the paver travel direction 128. A third alternative method provides the corrugated pattern 131 orienting a crisscross rhombus pattern 138 of the plurality of corrugations 132 acutely to the paver travel direction 128, as further described above. A fourth alternative method provides the corrugated pattern 131 progressively flattening the plurality of corrugations 132 in a dampening corrugated pattern 139 from the screed plate first side 106 toward the screed plate second side 107. The plurality of corrugations 131 in various embodiments of the present invention may have at least one of a repetitive wave form 135, such as a repetitive v-shaped pattern 136, a repetitive block shaped pattern 137, or a variably shaped wave pattern, shown FIG. 3A-C.

Another alternative embodiment of the present invention is a method for homogeneously applying paving material to a road surface 123 where the material matting apparatus 122 further comprises a vibrating and oscillating mechanism 129, generally depicted in FIG. 1, powered by the road paver/finisher 120. The vibrating and oscillating mechanism 129 causes the material matting apparatus 122 to forcibly operate horizontally and vertically upon the screed plate 101, providing a homogeneously sorting, horizontal and vertical driving function, on the paving material 110, concurrently adding force to the screed plate 101 providing homogeneous sorting and producing a more dense paving material 110.

The present invention may be used for various types of paving material 110, such as asphalt, concrete, and other aggregate type pavers. The heating element 151, depicted generally in FIG. 1, that would heat a conventional screed plate, now heats the structural/conductor plate 121 of the screed plate assembly 100 of the present invention.

Differing types of paving material 110 or textures of material, as noted above, may be employed to allow for differing products to be used to create a paving mat 153 on the road surface 123, as depicted in FIG. 1, to suit the construction specifications of a particular job construction site. As well, the screed plate 101, shown in FIGS. 2A-5 and 7, may be made of different materials. Examples of the types of plate materials include: cast nickel hardened, or "ni-hard", segments for superior wear life, or poly-plastics for paving concrete, or other uniquely textured materials for the plate materials in other construction applications.

The problem of having only once force vector, or one direction of force applied by the material matting apparatus 122 in FIG. 1, applied on the paving material 110 as it is paved, causing a heterogeneous material paving mat 153 paved on the road surface 123 is solved by the variable wave design or variable surface pattern 134 of the of the present invention, shown in FIGS. 3A-C, which variable surface pattern 134 encapsulates the paving material 110 and allows the material matting apparatus 122 to apply additional vectors of force to the paving material 110. The purpose of the variable wave corrugation or variable wave pattern 134 is to add varying force vectors to help organize and compact the paving material 110 being paved into a paving mat 153. The screed plate apparatus 100 of the present invention allows, therefore, the paving material 110 to be compartmentalize under the screed plate 101 by the addition of variable force vectors employed on the paving material 110 at varying angles, producing a more homogeneous paving mat 153.

The screed plate apparatus 100 of the present invention is driven in one alterative by the vibrating or oscillating mechanism 129 contained in the material matting apparatus 122, integral parts of the road paver/finisher 120, commonly used and recognized in the industry, and depicted in FIG. 1, which provides the varying force vectors to the paving material 110. The variable surface pattern 134 applied to a screed plate 101, depicted in FIGS. 2A-5 and 7, in the embodiments of the screed plate apparatus 100 is most effective when coupled with the addition of a vibration component, the vibrating and oscillating mechanism 129 applied to the screed plate 101 by the road paver/finisher 120 to move or drive the screed plate 101 paving material 110 at "off angles" with respect to the corrugations or wave of the particular screed plate 101, and/or with respect to the paver travel direction 128 of the road paver/finisher 120.

The screed plate apparatus 100 of the present invention allows for a variable corrugated or wave screed plate 101 opposing screed plate bottom side 105 with variable shapes or corrugations, corrugated pattern 131, and wave amplitudes and frequency, as shown in FIGS. 3A-C and 4A-B and 7, depending upon the required application of the paving material 110 to be paved into the paving mat 153 on the road surface 123, and the nature of the paving material 110, such as the aggregate size or constituent nature of the paving material 110. The plurality of corrugations 132 may run from parallel, FIG. 2A, or perpendicular, FIG. 2B, to the paver travel direction 128 of the road paver/finisher 120. As well, the corrugations may crisscross, FIG. 7 each other in certain other desired applications.

FIGS. 4A-B and 5 show the corrugated opposing screed plate bottom side 105 flattening or dampening toward the opposing screed plate back side 103. Essentially, the amplitude of the plurality of corrugations 132 of the corrugated waves is dampening, or goes to zero, toward the back of the screed plate 101, in the direction opposite of the paver travel direction 128 as the paving material 110 is being applied to the road surface 123.

The variable corrugated or wave screed plate 101 can be used in the road construction industry for the laying of pavement, using differing paving materials 110, including bituminous plant mix concrete, Portland cement concrete or other surface or subsurface materials. The flexibility [in sue] *therefore* will improve the texture and density of the paving material 110 directly behind the screed plate and make further compaction of the paving material where needed easier to achieve. The present invention may be used in any paving application where paving material 110 is being laid into the paving mat 153, from particulate materials, as well, for road surface 123, including for highways, airpost runways, roads and parking lot pavings.

The force applied by the road paver/finisher 120 may be characterized in terms of variable force vectors. The advantage of the present invention is that these variable force vectors will organize and apply added force to the paving material 110, improving paving mat 153 texture and density, as desired. One benefit of this advantage is to allow an increased over-all density to the paving mat 153, and increased density in road surface 123, combating ruts and irregularities, or, alternatively, providing more consistent densities when desired. A more stable road surface 123 is created thereby, with the additional compaction and a more even texture to the paving mat 153 when desired by a denser and more organized paving material 110 or aggregate.

Having thus described in detail a preferred selection of embodiments of the present invention, it is to be appreciated, and will be apparent to those skilled in the art, that many physical changes could be made in the apparatus without altering the invention, or the concepts and principles embodied therein. Unless otherwise specifically stated, the terms and expressions have been used herein as terms of description and not terms of limitation, and are not intended to exclude any equivalents of features shown and described or portions thereof. Various changes can, of course, be made to the preferred embodiment without departing from the spirit and scope of the present invention. The present invention apparatus, therefore, should not be restricted, except in the following claims and their equivalents.

Although specific advantages have been enumerated above, various embodiments may include some, none, or all of the enumerated advantages.

Other technical advantages may become readily apparent to one of ordinary skill in the art after review of the following figures and description.

It should be understood at the outset that, although exemplary embodiments are illustrated in the figures and described herein, the principles of the present disclosure may be implemented using any number of techniques, whether currently known or not. The present disclosure should in no way be limited to the exemplary implementations and techniques illustrated in the drawings and described herein.

Unless otherwise specifically noted, articles depicted in the drawings are not necessarily drawn to scale.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

We claim:

1. A [screed plate] *paving* apparatus, comprising:

(a) a screed plate comprising:

(i) a screed plate front side and an opposing screed plate back side;

(ii) a screed plate top side and an opposing screed plate bottom side;

(iii) a screed plate first side and an opposing screed plate second side;

(iv) a coupling element incorporated into the screed plate front side; and (v) at least two screed plate attaching means located on the screed plate top side;

(b) a road paver/finisher comprising:

(i) a material matting apparatus having a plate bottom [and paving material];

(ii) a structural/conductor plate, comprising: a conductor top side and an opposing conductor bottom side, a conductor front side and an opposing conductor backside, a plurality of conductor plate fastening means, and at least two screed plate retaining means located on the opposing conductor bottom side;

(iii) the plurality of conductor plate fastening means securely attaching the structural/conductor plate at the conductor top side directly to the plate bottom of the [road paver/finisher] *material matting apparatus*;

[(iii) a power source attaching to] *(iv)* a heating element *between the plate bottom and the conductor top side*;

[(c)] *(v) a power source attached to the heating element,* the power source generating and providing at least one of electric, gas or hydraulic heat to the heating element causing the heating element to heat;

[(d) the heating element is freely and securely located between the plate bottom and the conductor top side and, immediately against the conductor top side providing direct heat to the structural/conductor plate;]

[(e)] *(c)* the at least two screed plate retaining means [securely and receiving] *each constructed to receive* the respective at least two screed plate attaching means, and the conductor front side [securely and freely receiving] *constructed to receive* the coupling element;

[(f) the structural/conductor plate securely and heat-conductively contacting and attaching at the opposing conductor bottom side to the screed plate at the screed plate top side;

(g) the structural/conductor plate providing indirect heat to the screed plate;

(h) the material matting apparatus applying the paving material to a road surface in a paver travel direction as traversed by the road paver/finisher;]

[(i)] *(d)* the opposing screed plate bottom side, further comprising: a textured surface, the textured surface impacting [the] paving material applied [homogeneously] by the material matting apparatus into a paving mat on [the] *a* road surface when the screed plate compacts the paving material to the road surface as the road paver/finisher traverses the road surface in [the] *a* paver travel direction; and

[(j)] *(e)* the textured surface comprising: a corrugated pattern comprising[:] a plurality of corrugations.

2. The [screed plate] *paving* apparatus of claim 1, wherein [the corrugated pattern comprising:] the plurality of corrugations [orienting] *are oriented* parallel to the paver travel direction.

3. The [screed plate] *paving* apparatus of claim 1, wherein [the corrugated pattern comprising:] the plurality of corrugations [orienting] *are oriented* perpendicularly to the paver travel direction.

4. The [screed plate] *paving* apparatus of claim 1, wherein the corrugated pattern [comprising:] *comprises* a crisscross rhombus pattern of the plurality of corrugations acutely [orienting] *oriented* to the paver travel direction.

5. The [corrugated pattern] *paving apparatus* of claim 2 [comprising:], *wherein* the plurality of corrugations progressively [flattening] *flatten* in a dampening corrugated pattern from the screed plate first side toward the opposing screed plate second side.

6. The [screed plate] *paving* apparatus of claim 1, wherein plurality of corrugations [comprising:] *comprise* at least one of a repetitive wave form, a repetitive v-shaped pattern, *or* a repetitive block shaped pattern[, or a variably shaped wave pattern].

7. The [screed plate] *paving* apparatus of claim 1, wherein the material matting apparatus further comprises:

[(a)] a vibrating and oscillating mechanism powered by the road paver/finisher[; and (b) the vibrating and oscillating mechanism causing] *so as to cause* the material matting apparatus to forcibly operate horizontally and vertically upon the screed plate[; and (c) the vibrating and oscillating mechanism adding force to the screed plate to produce a more dense paving material].

8. A [screed plate] *paving* apparatus, comprising:

(a) a screed plate comprising:

(i) a screed plate front side and an opposing screed plate back side;

(ii) a screed plate top side and an opposing screed plate bottom side;

(iii) a screed plate first side and an opposing screed plate second side;

(iv) a coupling element incorporated into the screed plate front side; and (v) at least two screed plate attaching means located on the screed plate top side;

(b) a road paver/finisher comprising:

(i) a material matting apparatus [having a plate bottom and paving material];

(ii) at least two screed plate retaining means [located on the plate bottom]; and (iii) [a power source attaching to] a heating element *between the material matting apparatus and the screed plate top side and arranged to provide direct heat to the screed plate*;

[(c) the] (*iv*) *a* power source generating and providing at least one of electric, gas or hydraulic heat to the heating element causing the heating element to heat the screed plate;

[(d) the heating element is freely and securely located between the plate bottom and the screed plate top side and, immediately against the screed plate top side providing direct heat to the screed plate;]

[(e)] (*c*) the at least two screed plate retaining means securely [and] receiving the respective at least two screed plate attaching means, and the [bottom plate securely and freely] *material matting apparatus releasably* receiving the coupling element;

[(f) the heating element providing direct heat to the screed plate;

(g) the material matting apparatus applying the paving material to a road surface in a paver travel direction as traversed by the road paver/finisher;]

[(h)] (*d*) the opposing screed plate bottom side, further comprising: a textured surface, the textured surface impacting [the] paving material applied [homogeneously] by the material matting apparatus into a paving mat on [the] *a* road surface when the screed plate compacts the paving material to the road surface as the road paver/finisher traverses the road surface in [the] *a* paver travel direction; and

[(i)] (*e*) the textured surface comprising: a corrugated pattern comprising[:] a plurality of corrugations.

9. A method for homogeneously applying paving material to a road surface, the method comprising:

[(a) providing a screed plate, (i) the screed plate comprising: a screed plate front side and an opposing screed plate back side, a screed plate top side and an opposing screed plate bottom side, and a screed plate first side an opposing screed plate second side and at least two screed plate attaching means located on the screed plate top side; and (ii) incorporating a coupling element into the screed plate front side;

(b) providing a road paver/finisher, the road paver/finisher comprising: a material matting apparatus having paving material, a plate bottom and a structural/conductor plate;

(c) providing the structural/conductor plate comprising: a conductor top side and an opposing conductor bottom side, a conductor front side and an opposing conductor backside, a plurality of conductor plate fastening means, and at least two screed plate retaining means located on the opposing conductor bottom side;

(d) securely] attaching [the] *a* structural/conductor plate by [the] *a* plurality of conductor plate fastening means at [the] *a* conductor top side [directly to the plate bottom of] *to* the road paver/finisher;

[(e) providing a power source to the road paver/finisher] attaching *a power source* to a heating element *between a plate bottom of the road paver/finisher and the conductor top side of the structural/conductor plate to provide heat to the structural/conductor plate*;

[(f)] generating and providing electricity by the power source to the heating element causing the heating element to heat;

[(g) locating the heating element freely and securely between the plate bottom and the conductor top side and immediately against the conductor top side to provide direct heat to the structural/conductor plate;]

[(h)] securely [and] receiving the [respective] at least two screed plate attaching means, *located on a screed plate top side of a screed plate,* to [the] *a respective* at least two screed plate retaining means *located on a conductor bottom side opposing the conductor top side* and [securely and freely] receiving [the] *a* coupling element *at a screed plate front side* against [the] *a* conductor front side *of the structural/conductor plate*; *and*

[(i) securely and heat-conductively contacting and attaching the structural/conductor plate at the opposing conductor bottom side to the screed plate at the screed plate top side:

(j) providing indirect heat through the structural/conductor plate to the screed plate;

(k)] applying [the] *a* paving material from [the] *a* material matting apparatus *of the road paver/finisher* to [a] *the* road surface in a paver travel direction as traversed by the road paver/finisher; *where*

[(l) providing the opposing] *a* screed plate bottom side[, further comprising:] *opposing the screed plate top side comprises* a textured surface impacting the paving material applied by the matting material apparatus on the road surface when the screed plate compacts the paving material into a paving mat to the road surface as the road paver/finisher traverses the road surface in the paver travel direction[; and (m) whereby the screed plate homogeneously applies paving material as the paving mat to the road surface].

10. The method for applying paving material homogeneously to a road surface of claim 9, wherein the textured surface [comprising:] *comprises* a corrugated pattern comprising a plurality of corrugations.

11. The method for homogeneously applying paving material to a road surface of claim 9, *the method* further comprising: orienting the plurality of corrugations parallel to the paver travel direction.

12. The [corrugated pattern] *method for homogeneously applying paving material to a road surface* of claim 10, *the method* further comprising: [the plurality of corrugations] orienting *the plurality of corrugations* perpendicularly to the paver travel direction.

13. The [corrugated pattern] *method for homogeneously applying paving material to a road surface* of claim 10 further comprising: [the plurality of corrugations] orienting *the plurality of corrugations* in a crisscross rhombic pattern acutely to the paver travel direction.

14. The method for homogeneously applying paving material to a road surface of claim 9 [further comprising: progressively flattening], *wherein* the plurality of corrugations *progressively flatten* in a dampening corrugated pattern from the screed plate first side toward the screed plate second side.

15. The [plurality of corrugations] *method for homogeneously applying paving material to a road surface* of claim 10 [comprising:], *wherein the plurality of corrugations comprise* at least one of a repetitive wave form, a repetitive v-shaped pattern, *or* a repetitive block shaped pattern[, or a variably shaped wave pattern].

16. The method for homogeneously applying paving material to a road surface of claim 9, the method further comprising:

[(a)] providing the material matting apparatus [further comprising:

(i)] *with* a vibrating and oscillating mechanism powered by the road paver/finisher[; and (ii) the vibrating and oscillating mechanism causing] *which causes* the material matting apparatus to forcibly operate horizontally and vertically upon the screed plate[; and (b) adding force to the screed plate from the vibrating and oscillating mechanism, driving and moving the screed plate horizontally and vertically, providing homogeneous sorting and producing a more dense paving material].

*17. A road paver comprising:*

*a structural/conductor plate having:*

*a conductor top side;*

*a conductor bottom side opposing the conductor top side;*

*a conductor front side extending from a first edge of the conductor top side to a first edge of the conductor bottom side;*

*a conductor backside opposite the conductor front side, the conductor backside extending from a second edge of the conductor top side to a second edge of the conductor bottom side; and*

*a screed plate selectively engageable with the structural/conductor plate proximal to the conductor bottom side of the structural/conductor plate, the screed plate having a paving surface side with a plurality of mounds, hummocks or topographical highs extending therefrom, wherein the plurality of mounds, hummocks or topographical highs form a crisscross rhombic pattern;*

*wherein the screed plate further includes:*

*a side opposite the paving surface side;*

*a screed front side extending between the paving surface side and the side opposite the paving surface side;*

*a screed backside opposing the screed front side and extending between the paving surface side and the side opposite the paving surface side;*

*a coupling element positioned at the screed front side, the coupling element being coupleably engageable with the conductor front side; and*

*two screed plate attaching means positioned at the screed backside, the two screed plate attaching means and the coupling element releaseably securing the screed plate with the conductor backside;*

*wherein the two screed plate attaching means comprise a threaded bolt;*

*and wherein the threaded bolt is arranged so that a longitudinal axis thereof is approximately parallel to the side opposite the paving surface side.*

*18. The road paver according to claim 17, wherein the crisscross rhombic pattern includes plurality of rhombic edges oriented acutely relative to a paver travel direction of the screed plate.*

*19. A screed plate comprising a base plate having a paving surface side with a plurality of mounds, hummocks or topographical highs extending therefrom, the plurality of mounds, hummocks or topographical highs arranged in a crisscross rhombic pattern;*

*the screed plate further comprising:*

*a screed front side extending between the paving surface side and a side opposite the paving surface side;*

*a screed backside opposing the screed front side and extending between the paving surface side and the side opposite the paving surface side;*

*a coupling element positioned proximal to the screed front side and constructed to coupleably engage the screed plate to a road paver; and*

*two screed plate attaching means positioned proximal to the screed backside, and configured to cooperate with the coupling element to releaseably secure the screed plate to the road paver;*

*wherein the two screed plate attaching means comprise a threaded bolt; and*

*wherein the threaded bolt is arranged so that a longitudinal axis thereof is approximately parallel to the side opposite the paving surface side.*

*20. The screed plate according to claim 19, wherein the plurality of mounds, hummocks or topographical highs are configured to apply variable force vectors to a paving material when the screed plate is moved in a paver travel direction of the screed plate across the paving material.*

*21. A road paver comprising:*

*a screed plate including:*

*a paving surface side; and*

*a plurality of mounds, hummocks or topographical highs extending from the paving surface side, the plurality of mounds, hummocks or topographical highs being arranged in a crisscross rhombic pattern,*

*wherein the screed plate is configured to be releasably attached to a lower portion of the road paver;*

*wherein the screed plate further includes:*

*a side opposite the paving surface side;*

*a screed front side extending between the paving surface side and the side opposite the paving surface side;*

*a screed backside opposing the screed front side and extending between the paving surface side and the side opposite the paving surface side;*

*a coupling element at the screed front side, the coupling element being coupleably engageable with a conductor front side; and*

*two screed plate attaching means at the screed backside, the two screed plate attaching means and the coupling element releaseably securing the screed plate with a conductor backside;*

*wherein the two screed plate attaching means comprise a threaded bolt; and*

*wherein the threaded bolt is arranged so that a longitudinal axis thereof is approximately parallel to the side opposite the paving surface side.*

*22. The road paver according to claim 21, wherein the crisscross rhombic pattern includes plurality of rhombic edges oriented acutely relative to a paver travel direction of the screed plate.*

*23. A screed assembly comprising:*

*a screed plate including:*

*a paving surface side; and*

*a plurality of mounds, hummocks or topographical highs extending from the paving surface side,*

*the plurality of mounds, hummocks or topographical highs being arranged in a crisscross rhombic pattern,*

*wherein the screed plate is configured to be releasably attached to the screed assembly;*

*wherein the screed plate further includes:*

*a side opposite the paving surface side;*

*a screed front side extending between the paving surface side and the side opposite the paving surface side;*

*a screed backside opposing the screed front side and extending between the paving surface side and the side opposite the paving surface side;*

*a coupling element positioned proximal to the screed front side and constructed to coupleably engage the screed plate to a road paver; and*

*two screed plate attaching means positioned proximal to the screed backside, the two screed plate attaching means and the coupling element releaseably securing the screed plate to the road paver;*

*wherein the two screed plate attaching means comprise a threaded bolt; and*

*wherein the threaded bolt is arranged so that a longitudinal axis thereof is approximately parallel to the side opposite the paving surface side.*

*24. The screed assembly according to claim 23, wherein the plurality of mounds, hummocks or topographical highs are configured to apply variable force vectors to a paving material when the screed plate is moved in a paver travel direction of the screed plate across the paving material.*

*25. The screed assembly according to claim 23, wherein the crisscross rhombic pattern includes plurality of rhombic edges oriented acutely relative to a paver travel direction of the screed plate.*

*26. A screed assembly comprising:*

*a screed plate including:*

*a paving surface side; and*

*a plurality of mounds, hummocks or topographical highs extending from the paving surface side,*

*wherein the screed plate is releaseably attachable to the screed assembly, and*

*wherein the plurality of mounds, hummocks or topographical highs form a rhombic pattern;*

*wherein the screed plate further includes:*

*a screed front side extending between the paving surface side and a side opposite the paving surface side;*

*a screed backside opposing the screed front side and extending between the paving surface side and the side opposite the paving surface side;*

*a coupling element positioned proximal to the screed front side and constructed to coupleably engage the screed plate to a road paver; and*

*two screed plate attaching means positioned proximal to the screed backside, the two screed plate attaching means and the coupling element releaseably securing the screed plate to the road paver;*

*wherein the two screed plate attaching means comprise a threaded bolt; and*

*wherein the threaded bolt is arranged so that a longitudinal axis thereof is approximately parallel to the side opposite the paving surface side.*

*27. The screed assembly according to claim 26, wherein the plurality of mounds, hummocks or topographical highs are configured to apply variable force vectors to a paving material when the screed plate is moved in a paver travel direction of the screed plate across the paving material.*

*28. The screed assembly according to claim 26, wherein the rhombic pattern includes plurality of rhombic edges oriented acutely relative to a paver travel direction of the screed plate.*

* * * * *